United States Patent [19]

Marcantonio

[11] 4,450,552
[45] May 22, 1984

[54] LINEAR VELOCITY CONTROL MEANS

[75] Inventor: Angelo R. Marcantonio, Princeton, N.J.

[73] Assignee: RCA Corporation, New York, N.Y.

[21] Appl. No.: 363,809

[22] Filed: Mar. 31, 1982

[51] Int. Cl.³ ............................................. G11B 19/24
[52] U.S. Cl. .................................... 369/240; 369/243; 369/267
[58] Field of Search ............... 369/240, 267, 239, 241, 369/243, 266

[56] References Cited

U.S. PATENT DOCUMENTS

| | | | |
|---|---|---|---|
| 2,328,515 | 8/1943 | Van Overeem | 369/240 |
| 2,505,630 | 4/1950 | Weathers | 369/240 |
| 3,646,259 | 2/1972 | Schuller | 369/240 |
| 4,079,942 | 3/1978 | Kunen | 369/266 |

FOREIGN PATENT DOCUMENTS 347094  1/1919  Fed. Rep. of Germany ...... 369/240
148272  5/1981  German Democratic Rep. ................................. 369/267

Primary Examiner—Steven L. Stephan
Attorney, Agent, or Firm—J. S. Tripoli; R. L. Troike; D. W. Phillion

[57] ABSTRACT

A velocity control system for a rotating disc having a spiralling track thereon and comprising an arm rotatable about a fixed axis, a stylus attached to such arm and positioned to follow the spiralling track, and logic responsive to the position of the arm to produce a control signal indicative of the position of the arm. Also provided is a prime mover responsive to the control signal to rotate the disc at an angular velocity to produce a velocity at the point of contact between the stylus and the disc which is a predetermined function of the position of the stylus.

4 Claims, 5 Drawing Figures

LINEAR VELOCITY CONTROL MEANS

This invention relates generally to structure for controlling the angular velocity of a rotating disc, such as an audio record, and more particularly to a system for maintaining the linear velocity of the disc with respect to a stylus as a given function of the stylus position on the disc.

In the prior art, records usually run at constant angular velocity so that the linear velocity of the record with respect to the stylus is greatest when the stylus is near the outer edge of the record and decreases linearly as the stylus moves in towards the center of the record. This, of course, implies that a time length of signal recorded near the center of the record occupies a shorter length of track than does a corresponding time length of recording made closer to the outer perimeter of the record, thereby resulting in decreased frequency response with respect to the audio or video and audio (video discs) signals recorded near the center of the record. In order to maintain the same degree of fidelity throughout the recording it is necessary to increase the angular velocity of the master disc as the recorded portion approaches the center thereof and also to increase the angular velocity of the resultant record pressings in a similar manner as the stylus moves towards the center of the record in the spiralling groove.

In accordance with a preferred form of the invention there is provided a velocity control for a rotating disc having a spiral track thereon and comprising a potentiometer having an external arm rotatable about a fixed axis with the potentiometer constructed to produce an output signal whose magnitude is a predetermined function of the angular position of the arm. A stylus is secured to the arm and positioned to ride in the spiral track along an arcuate path whose radius is the line between the fixed axis and the point of coincidence between the stylus and the disc. Logic including a prime mover is responsive to the output of the potentiometer to rotate the disc at an angular velocity to produce a predetermined linear velocity at the point of coincidence between the stylus and the disc which velocity is a predetermined function of the position of the arm along the arcuate path.

Figure 1:
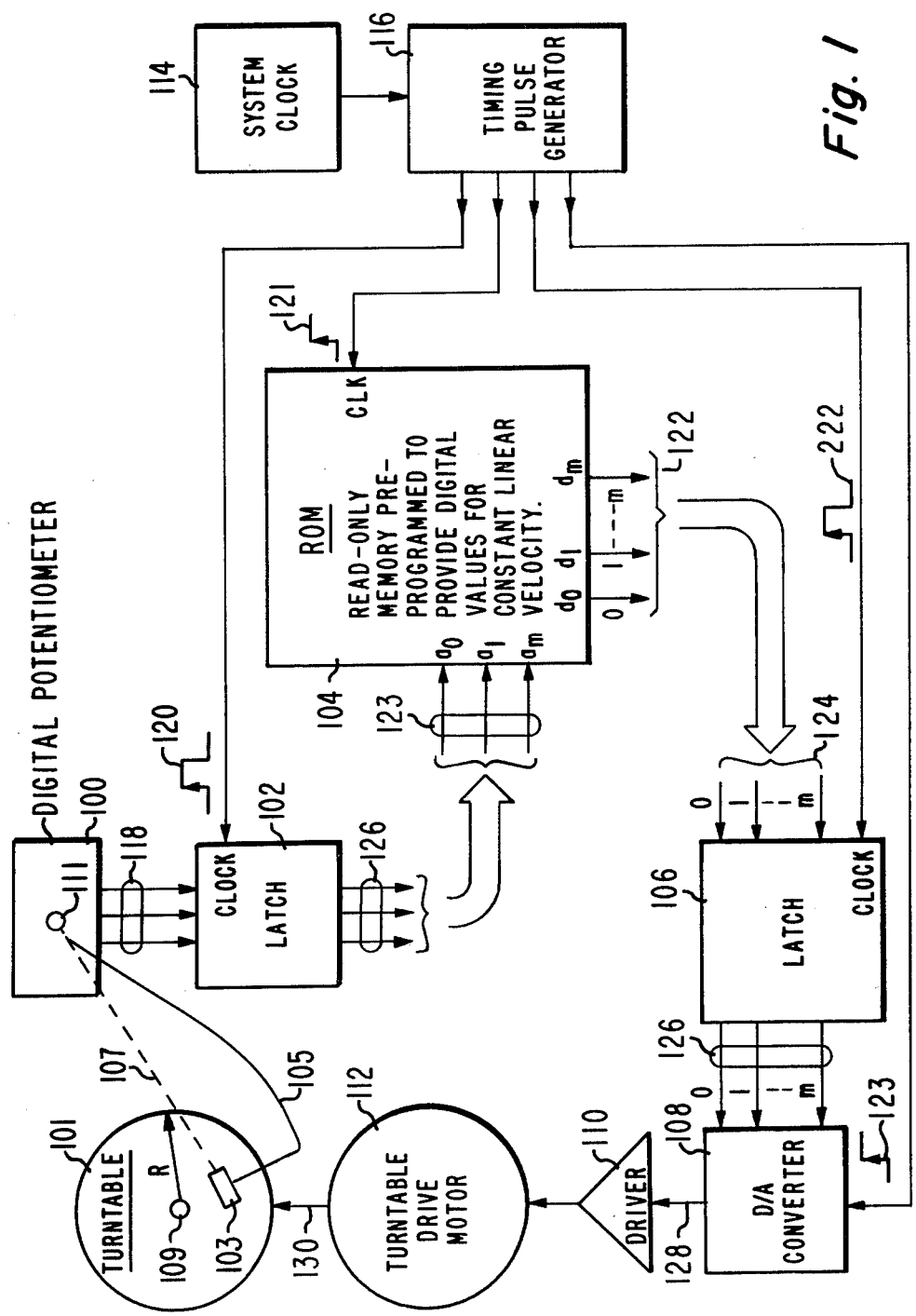
FIG. 1 is a block diagram of one form of the invention.

Referring now to FIG. 1 there is shown a turntable 101 driven by a turntable drive motor 112 about an axis 109. A record having a playing radius R can have the usual spiral track such as a groove, formed thereon, which a stylus 103, either mechanical or optical, follows. The stylus 103 can be attached to an arm 105 which is rotatable about an axis 111 in a digital potentiometer 100. The actual radius of the stylus 103 with respect to the rotatable axis 111 is indicated by the dotted line 107. Thus, the actual position of the stylus 103 along the record radius R is indicated by the angular position of the arm 105, and thus the radius 107, with respect to the rotatable axis 111.

It is characteristic of a digital potentiometer that it will produce a digital signal indicative of the angular position of the axis 111. In most digital potentiometers, the output is linearly proportional to the angular rotation of the axis 111 although other functional relationships can easily be built into a digital potentiometer and, in fact, are currently available on the market. A particular digital potentiometer suitable for the present invention is manufactured by Standard Griggsby, Inc. of Aurora, Ill. and is identified as Model No. CBXP-0300-64-1. Such digital potentiometers are constructed so that the digital output appearing on output leads 118 will change each predetermined angular displacement of the axis 111. Furthermore, to minimize the possibility of transients occurring during each change in the digital output word, a Gray code can be employed wherein no more than one bit position changes with each change in the digital output. However, other binary codes can be employed depending upon the sensitivity and precision required in the particular application of the invention.

Thus, at all times except during the very short transition times, there is a digital word supplied from the output of the potentiometer 100 to the input of latch 102 via leads 118. It is to be understood that leads 118, shown in FIG. 1 as the output of the potentiometer 100, can consist of more than three leads, thus providing finer increments of angular change.

Figure 3:
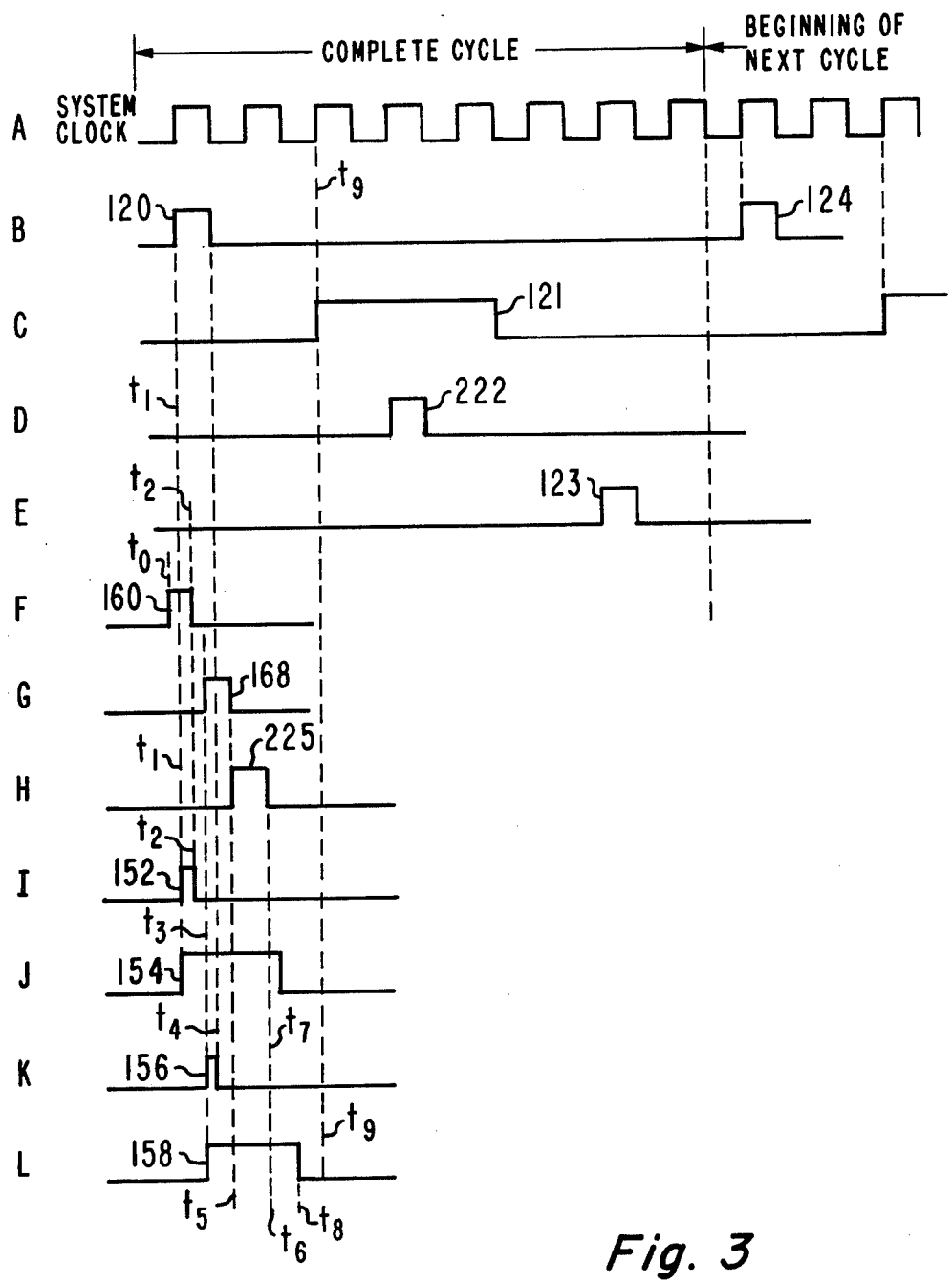
FIG. 3 is a set of timing diagrams to facilitate an understanding both FIGS. 1 and 2.

At the occurrence of the leading edge of clock pulse 120 of waveform A of FIG. 3 the latch 102 will receive and store the digital words being supplied thereto via leads 118. Upon the trailing edge of pulse 120 the word stored in latch 102 will be supplied via its output leads 126 to the input leads 125 of ROM 104.

It is to be noted that the pulses of waveform C of FIG. 3 comprise one of four timing pulse trains generated within timing pulse generator 116 in response to the clock pulse train supplied from the system clock source 114 as shown in waveform A of FIG. 3.

Figure 2:
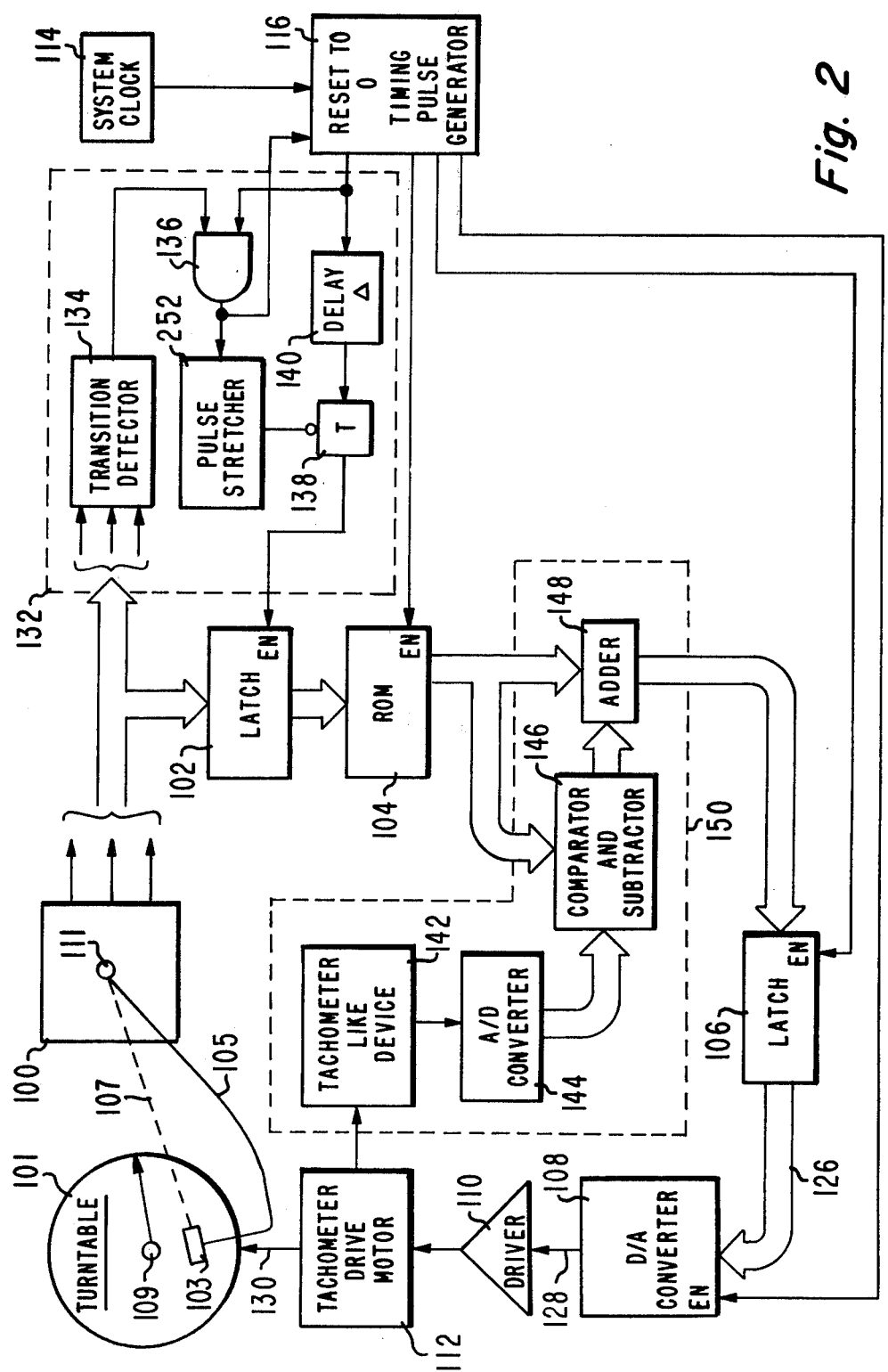
FIG. 2 is a block diagram of a modified form of the invention.

For purposes of brevity, the four timing pulse trains of FIG. 3 will be referred to herein as waveforms 3A, 3B, etc. rather than waveform A, waveform B, etc. of FIG. 3. Certain specific pulses shown in the waveforms of FIG. 3 are also shown in FIGS. 1 and 2 and are identified by the same reference characters.

Following the supplying of pulse 120 to the clock enable input of latch 102 pulse 121 (waveform 3C) is supplied to the clock enable input of ROM 104. The leading edge of pulse 121 will cause the address supplied to input leads 125 of ROM 104 to access the contents of the addressed word and to supply such accessed word to the output leads 122 of ROM 104. Such contents of the accessed word in ROM 104 will remain on output leads 122 until the trailing edge of pulse 121 occurs, as shown in waveform 3C. During the existence of pulse 121 a readout pulse 222 (waveform 3D) occurs which enables latch 106 to accept and store via its input leads 129 the word currently then appearing on output leads 122 of ROM 104.

Such stored word will then appear on the output leads 127 of latch 106 and subsequently, upon the occurrence of pulse 123 (waveform 3E) supplied to the enable input of D/A converter 108, the digital word appearing on the output terminals 127 of latch 106 will be converted to an analog signal. Such signal will be supplied to amplifier driver 110 via lead 128 and subsequently, to the turntable drive motor 112 which is mechanically coupled to turntable 101 via mechanical coupling 130.

The angular velocity of turntable 101 will then increase or decrease in accordance with the output of driver 110 which should be precisely determined by the digital word supplied from ROM 104. More specifically, ROM 104 contains N number of memory locations which, in the example given, is $2^3$ or 8 since the number of input leads to ROM 104 is 3. The contents of each of these 8 memory locations is a binary value that, when converted to an analog value in D/A converter 108, will drive the turntable drive motor 112 at a speed which, when a linear relationship is desired between the position of stylus 103 and the angular displacement of axis 111, will be proportional to the angular displacement of axis 111 measured from some zero reference point. Such a linear relationship can be measured from a reference point at the outer perimeter of the spiral track.

With 8 binary values stored in ROM 104 it is apparent that the angular velocity of the turntable will be divided into 8 different velocity segments since each of the binary values in the ROM 104 will cause driver 110 to drive motor 112 at a rate which is constant for the duration of each of the 8 binary values supplied from ROM 104.

The three lead example shown in FIG. 1 is only an example and would not be suitable for a recording requiring high precision. In such a case, more input leads and more memory locations in ROM 104 would be required. For example, with 8 input leads 256 digital words could be accessed in ROM 104 and thereby divide the angular velocity of the record into 256 velocity segments each having a different angular velocity and therefore a different linear velocity.

It is to be understood that the binary values stored in ROM 104 must be selected in accordance with the operating characteristics of the drive motor 112. Such motors ordinarily do not have angular velocities which vary precisely linearly with the driving currents supplied thereto. Accordingly, if it is desired to drive the turntable at an angular velocity which is proportional to the angular displacement of the arm 105, the binary values in ROM 104 cannot increase in a linear manner. Such binary values must necessarily change in a manner which will linearly increase the output of the angular velocity of drive motor 112. In order to arrive at the required binary values which must be stored in ROM 104, it is necessary to examine the operating characteristic of a given drive motor, i.e., the input current vs. angular velocity operating characteristics of a given drive motor, and divide such curve into segments corresponding to the values stored in ROM 104, thus resulting in a step function operating characteristic for drive motor 112. The binary value stored in ROM 104 corresponding to each velocity step or segment is then calculated to have a value which will drive the motor 112 so that the center points of the series of segments form a linear relationship.

Referring now to FIG. 2, there is shown a form of the invention in which transients that might occur during a change of the digital word outputted from potentiometer 100 will be prevented from affecting the operation of the system adversely. Such logic is shown within the dashed line logic block 132.

Additional logic shown within block 150 functions to check the actual angular turntable velocity against the digital word values supplied from ROM 104.

The remaining logic of FIG. 2 is the same as shown in FIG. 1 and corresponding components are identified by the same reference characters.

Referring now specifically to the logic within the dashed line block 132 assume that a change in the digital word output from potentiometer 100 occurs. Transition detector 134 will detect such a change, which occurs asynchronously with the clock pulses from system clock 114, and supply an output pulse 160 of predetermined width $t_0$-$t_2$, as shown in waveform 3F, to one input of AND gate 136. The pulse 120 (waveform 3B) from timing pulse generator 116 is supplied to the other input of AND gate 136 and also to the input of a delay 140 which has a delay time $\Delta$. The output of delay 140, which is designated as pulse 225 in waveform 3H, is supplied to the input of transmission gate 138 whose output is supplied to the enable input of latch 102, as discussed re FIG. 1.

If there is any time overlap between the random output of transition detector 134 and pulse 120 supplied to the two input terminals of AND gate 136 an output signal will be supplied from AND gate 136 to pulse stretcher 252 which will respond to the leading edge thereof to produce a stretched output pulse as shown in waveforms 3J or 3L.

The output pulses of waveforms 3J and 3L are shown as beginning at different times $t_1$ and $t_3$ because the output pulse from transition detector 134 occurs at different times. The earliest and latest times that an output pulse from the transition detector 134 can occur and have an overlap with the timing pulse 120 of waveform 3B are shown in waveforms 3F and 3G. The pulse 160 of waveform 3F overlaps the beginning of pulse 120 of waveform 3B to produce an output pulse 152 (see waveform 3I) from AND gate 136 of FIG. 2. It is this output pulse 152 which is supplied to the pulse stretcher 252 to produce the stretched pulse 154 of waveform 3J.

On the other hand, when the transition detected of detector 134 occurs at a later time, as shown in waveform 3G overlapping the trailing portion of pulse 120 at waveform 3B, an output pulse 156 of waveform 3K from AND gate 136 is generated and supplied to pulse stretcher 252 which responds thereto to produce the stretched pulse 158 of waveform 3L.

The occurrence of either of the stretched pulses 154 or 158 of waveforms 3J and 3L functions to disable the clock pulse outputted from delay line 140 from being supplied to latch 102, and thereby preventing the transmission of a false signal from latch 102 to ROM 104 if a transition in the output of the potentiometer 100 should occur during pulse 225 of waveform 3H.

Consider more specifically the case where the output of the transition detector 134 is represented by pulse 160 of waveform 3F. Such pulse 160 results in an output pulse 152 from AND gate 136 as described above. The pulse 152 of waveform 3I results in the stretched pulse 154 of waveform 3J. Such stretched pulse 154 has a time duration $t_1$-$t_7$ and is supplied to transmission gate 138 in its inverted form to disable said transmission gate 138 during the time period $t_1$-$t_7$. Thus, the timing pulse 225 of waveform 3H (which is delayed pulse 120 of waveform 3B) is prevented from passing through transmission gate 138 and being supplied to the enable input of latch 102. The delaying of clock pulse 120 of waveform 3B, which results in delayed clock pulse 225 of waveform 3H, ensures that the timing pulse 225 actually supplied to the enable gate input of latch 102 falls within the time interval of the stretched pulse 154 outputted from pulse stretcher 252. Thus, the latch 102 will not read a transient output from the potentiometer 100.

Should the transition of the signals outputted from potentiometer 100 occur near the trailing edge of pulse 120 of waveform 3B, an output pulse from transition detector 134 will occur as represented by pulse 168 of waveform 3G. Consequently, the pulse 168 of waveform 3G and pulse 120 of waveform 3B overlap to produce an output pulse 156 from AND gate 136 of FIG. 2. Such output pulse 156 is supplied to pulse stretcher 252 which responds thereto to produce the stretched pulse 158 of waveform 3L which begins at time $t_3$ and terminates at time $t_8$. Such stretched pulse 158 functions to disable transmission gate 138 for such time period $t_3-t_8$ which includes the time period $t_5-t_6$ during which the delayed pulse 225 of waveform 3H occurs, thus preventing the delayed pulse 225 from reaching latch 102.

Should the transition between signals in potentiometer 100 occur other than during pulse 120 of waveform 3B the system will continue operating in an uninterrupted manner since there will be no output from AND gate 136.

Turning now to the logic within block 150 of FIG. 2, a tachometer-like device 142 supplies an output signal to analog-to-digital (A/D) converter 144 which supplies a digital output to comparator and subtractor 146. The digital output from A/D converter 144 has a value representative of the measured angular velocity of drive motor 112 and, for any given such angular velocity, should be equal to the binary value stored in ROM 104 which represents the same angular velocity. Thus, the digital output from A/D converter 144 and the time coincident digital output from ROM 104 should be equal. Both digital values are supplied to comparator and subtractor 146. However, various environmental factors can affect the analog signals supplied to drive motor 112, causing false variations in angular velocity thereof. Thus, a given digital signal supplied to D/A converter 108 can result in an incorrect angular velocity of drive motor 112.

To correct for such an error the comparator and subtractor 146 respond to the digital signals supplied from A/D converter 144 and from ROM 104 to determine the difference therebetween. Such difference represents the difference in the actual measured velocity of the drive motor 112 and what it should be as defined by the corresponding binary value in ROM 104. Such difference value, which is in digital form and can be either positive or negative, is supplied to adder 148 to modify the output of ROM 104 to change the angular velocity of drive motor 112 so that it is, in fact, equal to the angular velocity as defined by the time coincident binary value in ROM 104.

Figure 4:
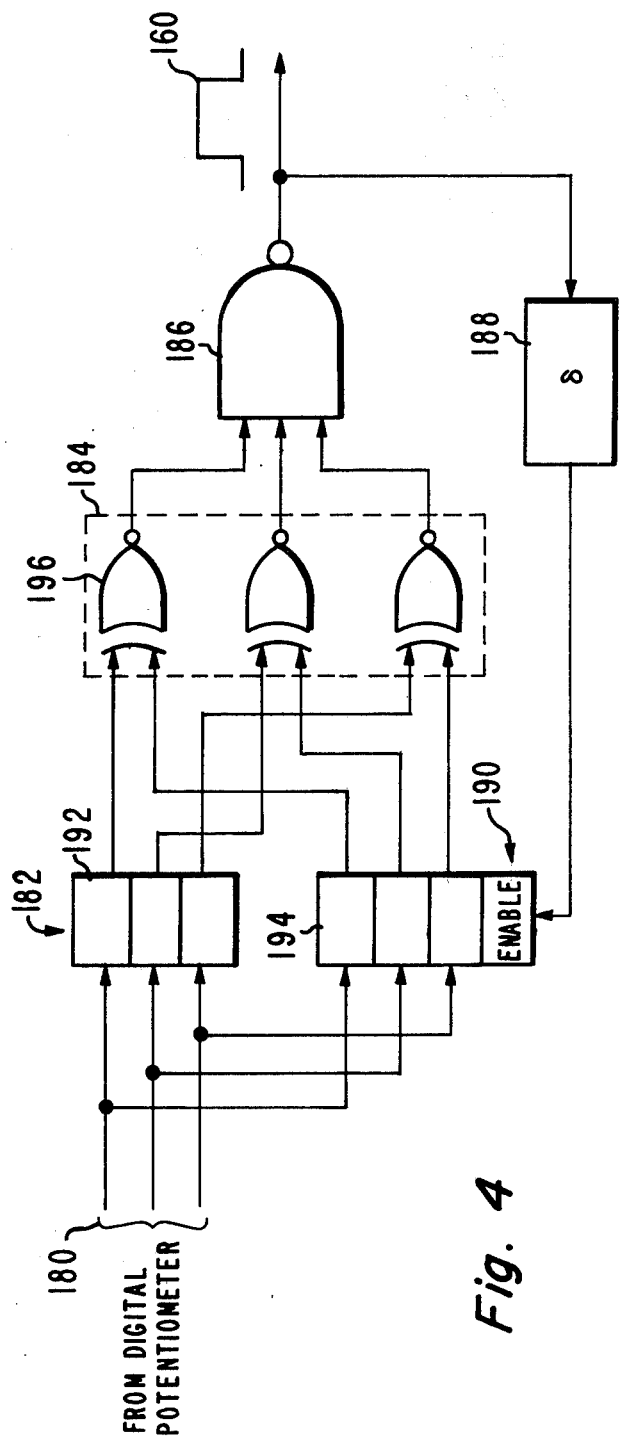
FIG. 4 is a detailed logic diagram of a portion of FIG. 2.

Referring now to FIG. 4 there is shown the logic diagram of one circuit which can be employed as the transition detector 134 of FIG. 2. In FIG. 4, the output from the potentiometer 100 of FIG. 2 is supplied to the input leads 180 of an N-stage register 182 which functions as a buffer storage. The contents of each of the stages of register 182 are supplied at all times to one input of each of the individual stages of the coincidence detector 184 which can be Exclusive NOR (XNOR) gates, as shown. A second N-stage register 190 has the contents of its various stages supplied to the second inputs of each of the coincident detectors 184. Thus, for example, the most significant bit (MSB) in stage 192 of register 182 and the contents of the MSB position 194 of register 190 are supplied to the two inputs of XNOR gate 196 of the group of coincidence detectors (XNOR gates) 184.

The outputs of each of the XNOR gates 184 are supplied to the inputs of NAND gate 186. It is evident that it is only when the outputs of all the XNOR gates 184 are binary 1's that the output of NAND gate 186 will be a binary 0. To supply all 1's to the inputs of AND gate 186, it is necessary that the inputs to each of the XNOR gates 184 be the same, i.e., either high level (binary 1's) or low level (binary 0's) signals. It is a characteristic of an XNOR gate that when the inputs thereto are of the same level, the output is a high level signal and when the inputs are of different levels then the output is a low level signal.

If the two inputs to all of the XNOR gates are the same, then the contents of registers 182 and 190 must be identical. Assume that at time $t_0$ in FIG. 5 the output of potentiometer 100 of FIG. 2 changes so that the contents of register 182 and 190 become different in at least one bit position. Thus, one of the XNOR gates will have different levels applied to its two inputs so that its output will be a 0 thereby causing the output of AND gate 186 to decrease from its low level to its high level. The leading edge of the high level signal will be supplied through $\delta$ delay 188 and subsequently, at time $t_2$, will enable register 190 to receive and store the new digital word being generated by potentiometer 100.

Figure 5:
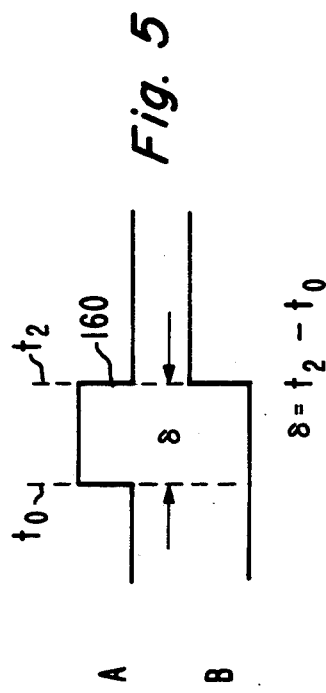
FIG. 5 shows timing waveforms relating to FIG. 4.

Thus, during the time interval $t_0-t_2$ in FIG. 5 beginning at time $t_0$ with the storage in register 192 of a new digital word supplied from potentiometer 101 and ending at time $t_2$ when the same digital word is entered into register 194, the output of AND gate 186 will be at a high level as indicated by the pulse 160 which is shown in both waveform 5A and waveform 3F. It is to be understood that if the transition of the output of potentiometer 100 should begin at time $t_3$ in FIG. 3, the transition pulse 168 of waveform 3G would result therefrom.

What is claimed is:

1. A velocity control for a rotating disc comprising:
   a digital potentiometer controllable by an arm rotatable about a fixed axis to produce a first series of digital output signals whose values are proportional to the simultaneous angular displacement of said arm;
   a rotating disc with a spiralling track thereon;
   a stylus secured to said arm;
   said arm, said disc, and said stylus being relatively positioned so that said stylus will follow said track across said disc in an arcuate path whose radius is equal to the distance between said fixed axis and the point of projection of said stylus upon said disc so that the angular movement of said arm is a measure of the position of said stylus along said arcuate path;
   signal generating means responsive to said first series of digital output signals to produce a control signal whose amplitude varies as a predetermined function of the values of said first series of digital output signals;
   prime mover means responsive to said control signal to rotate said disc at an angular velocity to cause the portion of the track directly underneath said stylus to have a velocity which is a function of the position of said stylus along said arcuate path, said last-mentioned function being determined by said predetermined function.

2. A velocity control as in claim 1 in which said signal generating means comprises:

memory means having a plurality of word storage locations successively addressable by successive ones of said first series of digital output signals to produce a second series of successive digital output signals; and means responsive to said second series of digital output signals to produce said control signal.

3. A method for controlling the velocity of a rotating disc with respect to a stylus which follows a spiral track formed on the surface of the disc and comprising the steps of:

measuring the radial distance R of the stylus from the rotational axis of the disc;

converting the measured radial distance to a first control signal having a value representing a desired angular velocity of said disc for any given value of R;

driving said disc at said desired angular velocity in response to said control signal;

generating a second control signal representing the actual angular velocity of said disc;

finding the difference value between said second control signal and said first control signal; and correcting the angular velocity of said disc by adding said difference value to said first control signal so that the second control signal produced by said corrected angular velocity of said disc is equal to said first control signal.

4. A velocity control for a rotating disc having an information containing track thereon which spirals inwardly from the edge of the disc towards the center thereof and comprising:

an information retrieving element;

means for guiding said information retrieving element along and adjacent said information containing track;

means for generating a series of digital signals indicative of the radial position of said information retrieving element with respect to the center of said rotating disc;

signal generating means responsive to said series of digital signals to produce a control signal whose amplitude varies as a predetermined function of the value of said series of digital signals; and prime mover means responsive to said control signal to rotate said disc at an angular velocity to cause the portion of the information containing track adjacent said information retrieving element to have a velocity which is a function of the radial position of said information retrieving element, said last mentioned function being determined by said predetermined function.

* * * * *